(12) United States Patent
Fischer et al.

(10) Patent No.: US 6,411,073 B1
(45) Date of Patent: Jun. 25, 2002

(54) METHOD AND DEVICE FOR LOCATING A METAL LINE

(75) Inventors: Gerhard Fischer, Dresden; Volker Fraedrich, Schmiedeberg; Christoph Wendel, Laufenburg, all of (DE)

(73) Assignee: Hagenuk KMT Kabelmesstechnik GmbH (DE)

( * ) Notice: Subject to any disclaimer, the term of this patent is extended or adjusted under 35 U.S.C. 154(b) by 65 days.

(21) Appl. No.: 09/584,658

(22) Filed: May 30, 2000

(30) Foreign Application Priority Data

Jul. 16, 1999 (DE) .......................... 199 33 333

(51) Int. Cl.[7] .................. G01R 19/00; G01R 19/14; G08B 13/14
(52) U.S. Cl. ................... 324/66; 324/67; 324/133; 340/572.4; 379/25
(58) Field of Search ................. 324/66, 67, 326, 324/327, 529, 114, 133; 379/25; 340/527.4

(56) References Cited

U.S. PATENT DOCUMENTS

| | | | | |
|---|---|---|---|---|
| 4,491,785 A | * | 1/1985 | Pecukonis | 324/67 |
| 5,260,659 A | * | 11/1993 | Flowerdew et al. | 324/326 |
| 5,438,266 A | * | 8/1995 | Tsang | 324/326 |
| 5,608,328 A | * | 3/1997 | Sanderson | 324/529 |

FOREIGN PATENT DOCUMENTS

| | | |
|---|---|---|
| DE | 27 26972 A1 | 1/1979 |
| DE | AT Nr.357634 | 7/1980 |
| DE | 36 23045 A1 | 1/1988 |
| DE | 37 08968 A1 | 6/1988 |
| DE | 38 36219 A1 | 5/1989 |
| DE | 41 03234 A1 | 8/1992 |

* cited by examiner

Primary Examiner—N. Le
Assistant Examiner—Anjan K. Deb
(74) Attorney, Agent, or Firm—Skjerven Morrill LLP; Gary J. Edwards

(57) ABSTRACT

A line locating device and method that is capable of determining the location of a line even when a significant amount of transmitted signal is coupled to neighboring lines. A device according to this invention includes a transmitter that couples a transmitted signal onto a metal line where the transmitted signal is a first signal having a carrier frequency modulated with second signal of a lower frequency. The device also includes a receiver that receives a received signal from the metal line and evaluates the signal in terms of period and polarity to determine an incoming signal or an outgoing signal. The receiver addresses an appropriate signaling unit in response to the incoming signal or the outgoing signal.

11 Claims, 1 Drawing Sheet

METHOD AND DEVICE FOR LOCATING A METAL LINE

BACKGROUND

1. Field of the Invention

The invention pertains to a method and a device for locating a metal line through the coupling of a transmitted signal into the line, and the receiving and evaluation of the level of a received signal radiated by the line.

2. Discussion of Related Art

Methods and devices are known that can be used to locate the course of a metal and electrically conductive line (cable, conduit) when an electric current flows through the line. In those devices, the electromagnetic field from this current is detected, processed and displayed. In the case of a method for improving the locating of a line, a transmitter is used whose defined signal is coupled into the line capacitively, inductively or conductively and causes a current flow in the line. As a result, the locating of the line can be carried out with a receiver which is optimized for detecting the defined signal from the transmitter.

Locating a line with relatively simple methods and devices is possible if the line is run individually. In practice, however, the problem often exists that several lines run alongside each other with comparatively little space between them. Even though the signal from the transmitter is connected to only one line, in the course of the line this primary signal can be coupled capacitively, inductively or conductively into one or more adjoining lines. The secondary current flowing in these other lines then leads to faulty locating.

An improvement of line locating can be achieved if the receiver additionally has at its disposal means for measuring and displaying the run depth of the line and the resulting current in the line. However, falsification of these measured values occurs whenever the fields from several lines superimpose on each other and strengthen or weaken the resulting field depending on the direction of the signal flow. It is thus impossible to distinguish two lines from each other if the primary transmission current is flowing in the one line to be located and the circuit is connected to the transmitter via a second line, caused, for example, by common circuits for the potential equalization.

A further improvement in line locating can be achieved if the signal from the transmitter contains an identifier from which the signal flow direction from or to the transmitter can be unequivocally determined.

In U.S. Pat. No. 5,260,659, a method and device are described using a transmitter which generates two frequencies, whereby a first frequency is an integral multiple of a second frequency. In an additional development of the device, a first frequency and a second frequency are generated, to which a subharmonic frequency of the first frequency is added or subtracted. To locate the line, the receiver evaluates the phase relationships of the frequencies, thus making it possible to determine the direction of the signal flow.

A similar instrument for locating a line in a network of multiple lines is described in U.S. Pat. No. 5,438,266. Using a transmitter, an even-numbered harmonic and an odd-numbered harmonic of a frequency are generated and connected to the line to be located. A receiver includes antennas and filters that are tuned to these frequencies. The locating of the line can be carried out through evaluation of the phase relationships, particularly the reversal of the phase relationships.

A substantial disadvantage of the methods and devices mentioned above is that reliable locating is successful only with comparatively short lengths of the line to be located. This disadvantage is based on the various changes of the phase relationships of the frequencies which are brought about by parasitic complex components of the line, for example, the self-capacitance or the self-inductance of the line. Moreover, there is a relatively high expense involved in the realization of a sufficiently great selectivity of the receiver's antennas and filters, each of which has to be separately optimized for one of the frequencies generated by the transmitter.

Another device for locating the course of lines is disclosed in DE 3708968. There, an identifier running in the direction of the current is superimposed on the signal from a transmitter. A special receiver evaluates the identifier and thus makes it possible to determine the direction of the current. The identification is carried out by superimposing the transmitted signal with unipolar pulses that are synchronized with the transmitted signal. In a further development of the device, the transmitted signal is broken into time-limited segments made up of at least one sine period, whereby the start of a segment after a transmission pause takes place with a defined edge of the sinusoidal signal. A substantial disadvantage of this device lies in the fact that the receiver for receiving the asymmetric and/or non-periodic signal has to be dimensioned to be relatively broadband, and so, as a result of the low selectivity, a substantial effect is possible from interference frequencies such as upper harmonics from the power supply network.

All of the previously mentioned methods and devices have the disadvantage that the use of several different periodic signals or asymmetric signals make for greater expense in the receiver in order to realize adequate selectivity with regard to interference influences, and that as a result of the influence of the complex parameters of the line such as the capacitance or the inductance, a dependency exists between the length of the line and the phase shift of the signal.

SUMMARY

According to the present invention, a method and a device for locating the course of a metal line is presented. With a method and device according to the present invention, a reliable identification of a line and an exact locating of the course of the line is possible, particularly in the case of multiple lines running in parallel.

In one embodiment, the transmitted signal is generated through the modulation of a first carrier frequency with a second, lower frequency. The received signal detected at the receiver is evaluated with regard to its period and its polarity, which is dependent on the orientation of a receiving antenna relative to the line. The evaluation results in a signaling of "outgoing transmitted signal" or "incoming transmitted signal" with regard to the direction of the signal flow in the line.

A transmitter according to the present invention includes a first generator having a first carrier frequency, a second generator having a second, lower frequency, and a modulator that modulates the first frequency with the second frequency. The corresponding receiver includes an evaluation device that evaluates the received signal with regard to its period and its polarity, which is dependent on the orientation of a receiving antenna relative to the line. The evaluation device addresses a second signaling unit for an "outgoing signal" and a third signaling unit for an "incoming signal".

The advantages of most embodiments of devices and methods in accordance with the invention result from the easily realized high selectivity of the receiver, the independence of the special, complex electrical parameters and the length of the line, and the unequivocal evaluation of the received signals, independently of the type of coupling of the transmitted signal from the transmission-carrying primary line to other secondary lines. Additional advantages result from the very wide range of the frequency band, whereby no major restrictions exist with regard to the frequency and the bandwidth. A simple adaptation of the method and the device is possible by choosing the fundamental frequency of the transmitted signal according to the type of line to be located with its special, complex electrical parameters. Thus, advantages result if the fundamental frequency is relatively low for lines with great self-capacitance, such as insulated conduits, for example, but the fundamental frequency is relatively high in branched networks with short cables.

Further details, features and advantages of the invention result from the following description, aided by the drawing, of a preferred form of implementation of the invention. The following are shown:

DETAILED DESCRIPTION

Figure 1:
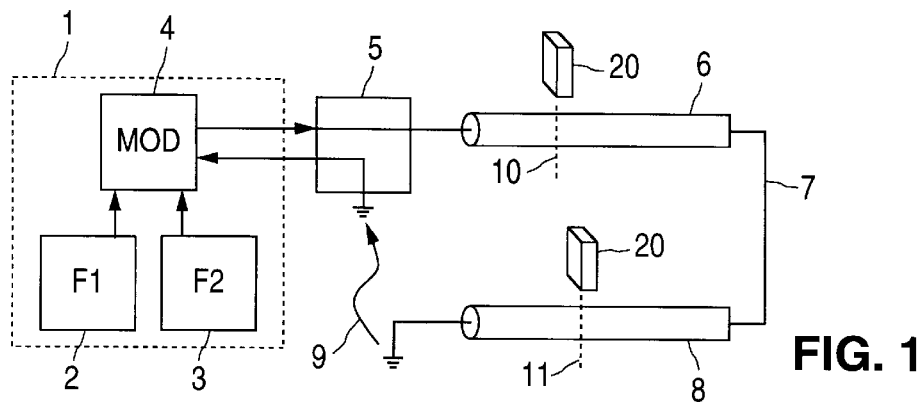
FIG. 1 shows a block circuit diagram of a device according to the invention, with transmitter line and receiver.

It can be seen from the complete circuit diagram in FIG. 1, that a transmitter 1 exhibits a first generator 2 that generates signal having a first frequency F1, a second generator 3 that generates signal having a second frequency F2, and a modulator 4 for coupling the two signals of frequencies F1 and F2. A two-pole output of transmitter 1 is connected at a coupling point 5 by one pole to a first line 6 which is to be located, and by the other pole to a grounding device 9. The signal flow takes place going out from transmitter 1 through the coupling point 5 into the first line 6, an electrical connection 7, a second line 8, a grounding device 9, and finally coming in at the transmitter 1. Shown are one position of a receiver 20 at a first position 10 over the first line 6, and a second position 11 over the second line 8.

The first frequency F1 is substantially greater than second frequency F2, whereby the factor between the two is preferably greater than 50.

The signal having first frequency F1 is modulated with the signal having second frequency F2, through frequency modulation, for example, whereby the parameters of the modulation are preset in such a way that transmitter 1 generates a relatively narrow-band signal which is coupled to the line 6 to be located, and which can be detected by the receiver 20. It is not absolutely necessary that the signals having the first and second frequencies F1 and F2 are sinusoidal or that the two frequencies have an even-numbered relationship to each other.

Figure 2:
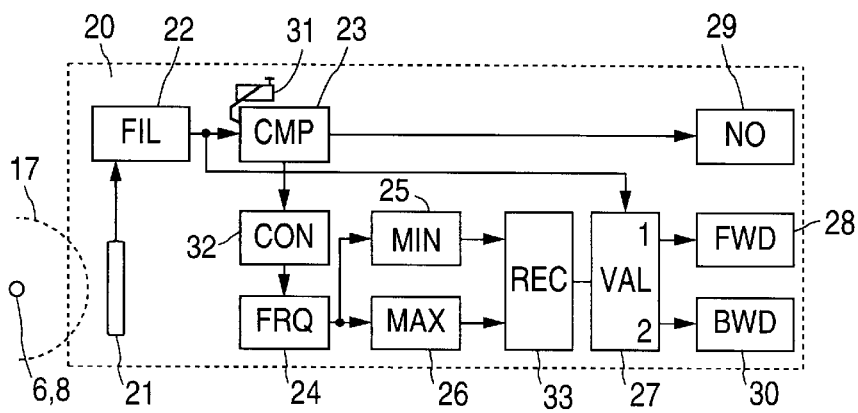
FIG. 2 shows a block circuit diagram of a receiver according to the present invention.

FIG. 2 shows a block circuit diagram of receiver 20, which is located in the vicinity of the first or second line 6, 8 and which, as the receiving antenna, picks up the transmitted signal 17 with a capacitive, inductive or conductive sensor 21. A filter 22 is tuned to the fundamental frequency of the first frequency F1, and, as a band-pass for narrow-band selection, is dimensioned with a bandwidth tuned to the second frequency F2. Connected with the output of the filter 22 are an evaluator 27, as well as a comparator 23, for evaluating the signal strength, which exhibits a device 31 for setting a preset threshold for the level of the received signal. A first output of the comparator 23 is connected to a converter 32, a second output to a first signaling unit 29 for a state "no signal". The converter 32 converts the filtered received signal FIL into a square wave signal of the same period, which is sent to a timer 24. The timer 24 addresses a minimum comparator 25 and a maximum comparator 26, the output signals of which control a square wave signal generator 33. The latter generates a square wave voltage which is connected to the evaluator 27. A first output VAL1 of the evaluator 27 is connected with a second signaling unit 28 for an "outgoing signal" (FWD), while a second output VAL2 of the evaluator 27 is connected with a third signaling unit 30 for an "incoming signal" (BWD).

The comparator 23 is used for the trivial generating of a state "signal no"=0 or "signal yes"=1, depending on the threshold for the strength of the received signal which was preset with device 31. If the comparator detects the state "signal no"=0, a disabling of the timer 24, the minimum comparator 25, the maximum comparator 26 and the evaluator 27 is carried out, along with a signaling at the first signaling unit 29 that no measurements are possible.

If the comparator 23 detects the state "signal yes"=1, the timer 24 continues to measure the period of the received signal FIL, which changes as a result of the modulation. The minimum comparator 25 is switched on if the period reaches a minimum threshold value, while the maximum comparator 26 is switched on if the period of a maximum threshold value is reached.

For that purpose, the timer 24 is realized in the form of a counter, the counting frequency of which is substantially higher than the first frequency F1, and which is started with the zero crossing of a first edge of the square wave signal generated by the converter 32 and stopped with a following second edge. The counter exhibits two registers, specifically, a first register for a current counter status and a second register for the previously attained counter status. The outputs of these two registers are connected with an internal comparator (not shown) which generates a "greater than", "equal to" or "less than" signal after the comparison. Following the generating of this compare signal, the content of the first register is loaded into the second register and the counter is enabled again for the next measurement. In that regard, the comparator can be designed in such a way that a compare signal is generated only if the result of the comparison changes. As a result, a minimum period is present and the minimum comparator 25 is connected if a change from "smaller than" to "equal to" takes place. In the reverse case, i.e., with a change for "greater than" to "equal to", a maximum period is present and the maximum comparator 26 is connected. This version has the advantage that no frequency dependency exists. The upper limit frequency of the input signal, the accuracy and the reaction time of this circuit unit 24 is dependent only on the clock frequency.

As an alternative to that, an additional comparator can be provided to which are sent the counter status and the compare values representing the two threshold values. Finally, to accomplish the above-mentioned purpose, analog methods could also be realized in which a capacitor is charged in dependency on the period, and the comparison is carried out by means of a sample and hold circuit plus an analog comparator.

As a result of connecting the minimum and maximum comparators 25, 26, an edge change takes place in the square wave voltage generated by the square wave signal generator 33, the period of which is thus equal to the period of the second frequency F2 from the transmitter 1. Alternatively, this square wave voltage can also be generated with a demodulator.

Figure 3:
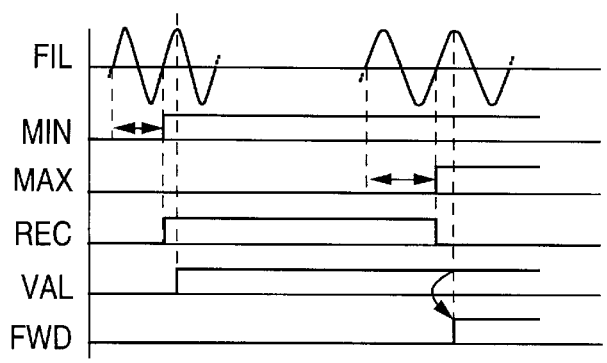
FIG. 3 shows the schematic progression of various signals for the state "outgoing"

By way of example, FIG. 3 shows the signal progressions and their links for the signaling of "outgoing signal" at the second signaling unit 28. As a result of the MIN switching signal from the minimum comparator 25, the square wave voltage REC assumes a 1 level, while as a result of the switching signal MAX from the maximum comparator 26, REC drops to the 0 level again. This square wave voltage REC is now linked in the evaluator 27 with the filtered received signal FIL, and is sent as the first output signal VAL1 to the second signaling unit 28, which generates a FWD signal if the polarity of the received signal FIL is positive at a 0/1 edge of the square wave signal REC, and the polarity of the received signal FIL is again positive at the following 1/0 edge of the square wave signal REC. That is the case when, for example, the receiver 20 is at position 10 over line 6.

Figure 4:
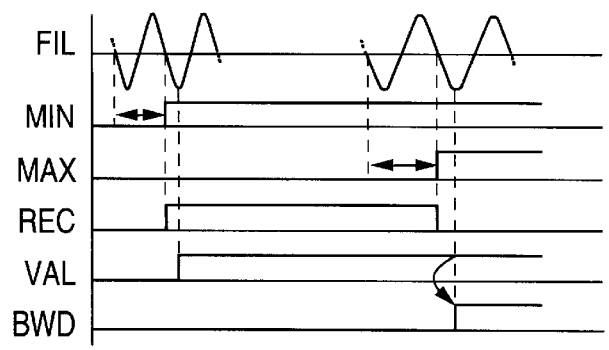
FIG. 4 shows the schematic progression of various signals for the state "incoming".

FIG. 4 shows the corresponding signal progressions and their links for the signaling of "incoming signal" at the third signaling unit 30. As a result of the MIN switching signal from the minimum comparator 25, the square wave voltage REC once again assumes a 1 level, while as a result of the switching signal MAX from the maximum comparator 26, REC drops to the 0 level again. This square wave voltage REC is now linked in the evaluator 27 with the filtered received signal FIL, and is sent as the second output signal VAL2 to the third signaling unit 30 which generates a BWD signal if the polarity of the received signal FIL is negative at a 0/1 edge of the square wave signal REC, and the polarity of the received signal FIL is again negative at the following 1/0 edge of the square wave signal REC. That is the case when, for example, the receiver 20 is at position 11 over line 8.

In a practical case, whether a positive or negative half-wave of the received signal FIL is present at the evaluator 27 depends on the orientation of the receiving antenna 21 over the line 6, 8. For example, if the receiving antenna is a horizontally directed open core coil and receiver 20 is rotated by 180° over the line 6, 8, a 180° phase shift occurs in the received signal. As a result, the activation signal also changes from FWD to BWD or vice-versa. A fundamental core of the invention thus lies in the resulting fact that the amplitude of the carrier frequency portion of the received signal (first frequency F1) experiences a phase shift due to this rotation of the receiver, while the low-frequency portion produced from that (REC signal with the second frequency F2) remains unchanged.

Thus, if the receiver 20, or more specifically, the receiving antenna, is moved along the line with no variation in the orientation relative to the latter (6, 7, 8), it is always the second signaling device 28 (with the FWD signal) that is activated. By contrast, if the receiver is moved over the lines transversely, a change of the activation signal to BWD takes place over the second line 8, since the orientation of the receiving antenna has changed by 180° versus the first line 6. The determination of the position of the receiver 20 relative to a line takes place in a known way through evaluation of the strength or level of the received signal.

Distinguishing between "outgoing signal" and "incoming signal" thus takes place by means of an exact determination of the period, with simultaneous evaluation of the polarity of the received signal. The relevant activation signal is not generated until a maximum period with positive (FIG. 3) or negative (FIG. 4) half wave occurs after a minimum period with a positive (FIG. 3) or negative (FIG. 4) half wave. If that is not the case, it is assumed that the corresponding minimum period was generated by a disturbance, or that the maximum period could not be found due to a disturbance.

With the described method, detection of the signal directions "outgoing" and "incoming" is thus possible independently of the length and the complex parameters of the line. In addition, the noise suppression can be further improved, and specifically, first through a very small bandwidth of the filter 22, which is made possible by means of the invention, and second, through repetition of the measurements and evaluations of several successive results, whereby, for example, the activation signals FWD, BWD activate the second and third signaling devices 28, 30 only if they occurred at least two times in a row.

The greater the ratio is between the first and the second frequency, the more narrow-band the input filter 22 can be dimensioned, and the better that disturbing influences can be suppressed, whereby stochastic disturbances in the pass band of the filter 22 can be eliminated through the multiple evaluation mentioned above. For example, the first frequency F1 can be 500 Hz and the second frequency F2 can be 5 Hz. If the parameters of the modulator 4 are selected in such a way that a frequency deviation of +/−5 Hz results, the filter can be kept very narrow-band with limit frequencies of 495 Hz and 505 Hz. An advantage of this dimensioning lies in the fact that in particular the upper harmonics of the power supply frequency can be suppressed, and likewise can cause no disturbances.

A further improvement of the signaling can be achieved if the signaling units consist of various signal transmitters, for example, optical signal transmitters whose signals differ in terms of color, symbol or text, and/or acoustic signal transmitters whose signals differ in terms of keying, pitch or loudness.

A simplified version of the device uses only one of the two comparators, and specifically, either the minimum comparator 25 or the maximum comparator 30.

A particular advantage of the form of implementation that has been explained also lies in the fact that the signal processing takes place almost entirely in digital form, and can be carried out by a microprocessor, for example. That is in essence based on the fact that an analog demodulator is not necessary because the demodulation takes place digitally.

The description of embodiments of the invention given above are exemplary only. Only skilled in the art will observe various modifications and variations that, although not specifically discussed in this disclosure, are considered within the scope of this invention. As such, the invention is limited only by the following claims.

We claim:

1. A method for locating a metal line, comprising:
 coupling of a transmitted signal into the line, the transmitted signal including a first signal having a carrier frequency modulated with a second signal having a lower frequency than the carrier frequency;
 receiving a received signal radiated by the line at a receiving antenna; and
 evaluating the received signal with regard to its period and its polarity, which is dependent on the orientation of the receiving antenna relative to the line, in order to generate a signaling of "outgoing transmitted signal" or "incoming transmitted signal" with regard to the direction of the signal flow in the line.

2. The method according to claim 1, wherein the period of the received signal is measured continuously and a signaling of "outgoing transmitted signal" is generated if a maximum period with positive half-wave occurs after a minimum period with positive half-wave.

3. The method according to claim 2, wherein the period of the received signal is measured continuously and a signaling of "incoming transmitted signal" is generated if a maximum period with negative half-wave occurs after a minimum period with negative half-wave.

4. The method according to claim 3, wherein the signaling is not generated until the condition has occurred multiple times in succession.

5. The method according to claim 2, wherein the signaling is not generated until the condition has occurred multiple times in succession.

6. The method according to claim 1, wherein the period of the received signal is measured continuously and a signaling of "incoming transmitted signal" is generated if a maximum period with negative half-wave occurs after a minimum period with negative half-wave.

7. The method according to claim 6, wherein the signaling is not generated until the condition has occurred multiple times in succession.

8. A device for locating a metal line, comprising:
   a transmitter capable of coupling a transmitted signal onto the metal line, the transmitter including
     a first generator outputting a first signal with a carrier frequency,
     a second generator outputting a second signal with a lower frequency, the lower frequency being lower than the carrier frequency, and
     a modulator receiving the first signal and the second signal and outputting the transmitted signal, the transmitted signal being the first signal modulated with the second signal; and
   a receiver capable of detecting and evaluating the level of a received signal radiated by the metal line in response to the transmitted signal, the receiver including
     an evaluation device that evaluates the received signal with respect to its period and its polarity and detecting an incoming signal or an outgoing signal, the evaluation device addressing a first signaling unit in response to the incoming signal and a second signaling unit in response to the outgoing signal.

9. The device according to claim 8, wherein the evaluation device includes:
   a timer;
   a minimum comparator coupled to the timer;
   a maximum comparator coupled to the timer;
   a square wave generator coupled to the minimum comparator and the maximum comparator, the square wave generator generating a square wave voltage which exhibits an edge change if the period of the received signal reaches a minimum threshold value or a maximum threshold value;
   an evaluator that receives the square wave voltage and the received signal and addresses the first signaling unit or the second signaling unit in response to the square wave voltage and the received signal.

10. The device according to claim 9, wherein the first signaling unit and the second signaling unit are each of a group consisting of one of the following: an optical signal transmitter whose signal differ in terms of color; an optical signal transmitted symbol; or an optical signal transmitted text; an acoustic signal transmitter whose signal differs in terms of key; an acoustic signal transmitter whose signal differs in terms of pitch; and an acoustic signal transmitter whose signal differs in terms of loudness.

11. The device according to claim 8, wherein the first signaling unit and the second signaling unit are each of a group consisting of one of the following: an optical signal transmitter whose signal differ in terms of color; an optical signal transmitted symbol; or an optical signal transmitted text; an acoustic signal transmitter whose signal differs in terms of key; an acoustic signal transmitter whose signal differs in terms of pitch; and an acoustic signal transmitter whose signal differs in terms of loudness.

* * * * *